United States Patent
Cox et al.

(10) Patent No.: US 6,449,054 B1
(45) Date of Patent: *Sep. 10, 2002

(54) DYNAMIC ASSIGNMENT OF GROUP ADDRESSES FOR CONTROLLING PARALLEL PERIPHERAL DEVICES

(75) Inventors: William B. Cox, Mountain View; David H. Elrod, Sunnyvale, both of CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,615

(22) Filed: Aug. 1, 1998

(51) Int. Cl.[7] ................................................ G06F 13/00
(52) U.S. Cl. ...................... 358/1.15; 358/1.13; 358/1.14
(58) Field of Search .............................. 358/1.15, 1.16, 358/1.14, 1.13, 1.12

(56) References Cited

U.S. PATENT DOCUMENTS 5,528,605 A * 6/1996 Ywoskus et al. ............. 371/33
5,548,578 A * 8/1996 Matsune et al. ............... 370/13
6,049,528 A * 4/2000 Hendel et al. ............... 370/235

* cited by examiner

Primary Examiner—Joseph Mancuso
Assistant Examiner—Douglas Tran
(74) Attorney, Agent, or Firm—Fitzpatrick, Cella, Harper & Scinto

(57) ABSTRACT

A high-speed, parallel document printing and duplication system sets up each of the multiple laser printers (106) with each a conventional individual network address and a new shared group network address. Each printer (106) "listens" to the network (102) for document data (402) sent to its group address. The assignment of printers (106) to sending devices (104) is controlled by a dynamic group addressing computer (302). Each printer (106) also may confirm receipt of document data (402) by sending a confirmation packet to the sending device (104). Such a system permits large numbers of printers (106) to receive each document without crowding the network (102) bandwidth and slowing system performance. Moreover, such a system enables dynamic reconfiguration of group assignments, which results in flexibility in the use of the multiple printers (106) to simultaneously print a number of jobs at various speeds.

23 Claims, 7 Drawing Sheets

DYNAMIC ASSIGNMENT OF GROUP ADDRESSES FOR CONTROLLING PARALLEL PERIPHERAL DEVICES

BACKGROUND OF THE INVENTION

1. Technical Field

This invention relates to document printing and duplication. More particularly, this invention relates to a network for high-speed, parallel document printing and duplication.

2. Description of Related Art

Large offices and fast turn-around copy centers run multiple printers and copy machines in parallel to speed processing of printing and duplication. Conventionally, a digital input document is created on a scanner 103 or other input device. The digitized input document may then be sent through dedicated cables 101 to multiple laser printers 105 or other output devices as shown in FIG. 1(a).

Alternatively, as shown in FIG. 1(b), a network compatible scanner 104 or other input device may send the digitized input document to a local area network (LAN) 102, such as an Ethernet network, to network compatible laser printers 106 or other output devices. The scanner 104 shown in FIG. 1(b) may be, for example, a GP200 model digital copier available from Canon Inc.

Such networks 102 are conventionally operated by sending packets from the scanner 104 to each individual printer 106. An individual printer 106 receives from the network 102 those packets which have a destination address identifying the individual printer 106. Practically speaking, such a system is limited to about six (6) printers 106 when implemented via a 10 megabit per second Ethernet network 102.

Such a system is shown in FIG. 2. FIG. 2 is a schematic diagram showing the data 202 for a document "n" being sent over a conventional network 102 six (6) times by a scanner 104, in order to be received and printed by six (6) printers 106. In such a system, the data 202 transmitted over the network 102 must double in order to cause two printers 106 to each produce a copy of the same document. Data 202 transmitted must increase by a factor of N in order to cause N printers 106 to each produce a copy of the same document.

In particular, at a resolution of 600 dots per inch (dpi), an 8.5 inch by 11 inch monochrome scanned image (1 bit per scanned pixel) contains about 4.2 Mbytes of data. Transmitting 4.2 Mbytes of data across a typical 10 BaseT (10 megabits per second) Ethernet network takes approximately 5 seconds. This transmission time is too long and significantly impacts the speed at which multiple copies of the document are printed. The time may be reduced to about 0.5 second by compressing the data (e.g., via JBIG or Group 3 fax compression techniques). Nevertheless, transmitting twenty (20) compressed pages (each 4.2 Mbytes of data before compression) still requires about ten (10) seconds of network transfer time. This is still a substantially long time, which adversely affects system performance.

From the above discussion, it is apparent that what is needed is a system in which the network transfer time of a document to multiple printers is decreased in order to enhance the speed at which multiple copies may be printed.

SUMMARY OF THE INVENTION

In order to avoid the above discussed drawbacks, a high-speed, parallel document printing and duplication system sets up each of the multiple laser printers (106) with each a conventional individual network address and a new shared group network address. Each printer (106) "listens" to the network (102) for document data (402) sent to its group address. The assignment of printers (106) to sending devices (104) is controlled by a dynamic group addressing computer (302). Each printer (106) also may confirm receipt of document data (402) by sending a confirmation packet to the sending device (104). Such a system permits large numbers of printers (106) to receive each document without crowding the network (102) bandwidth and slowing system performance. Moreover, such a system enables dynamic reconfiguration of group assignments, which results in flexibility in the use of the multiple printers (106) to simultaneously print a number of jobs at various speeds.

DESCRIPTION OF THE PREFERRED EMBODIMENTS

Figure 1:
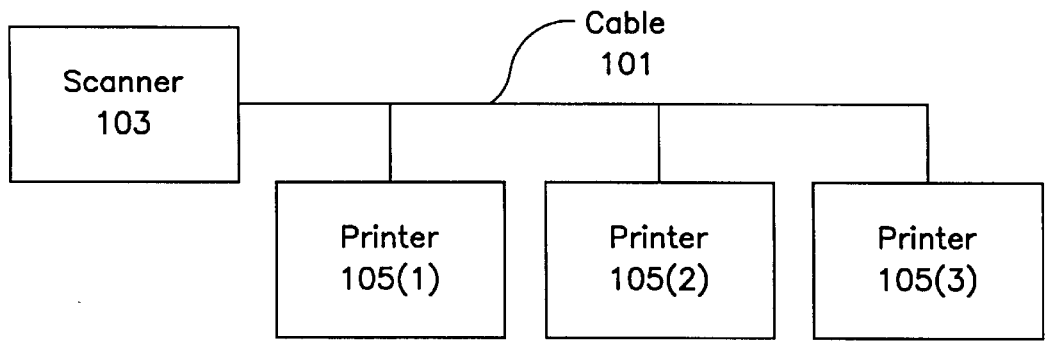
FIG. 1(a) is a schematic diagram of a conventional cable 101 connected system with a scanner 103 and multiple printers 105.
FIG. 1(b) is a schematic diagram of a conventional network 102-connected system with a scanner 104 and multiple printers 106.
Figure 1:
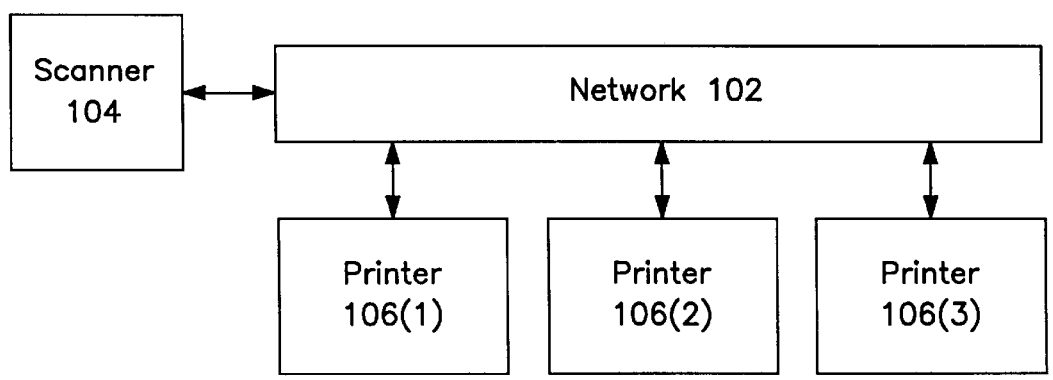
Figure 2:
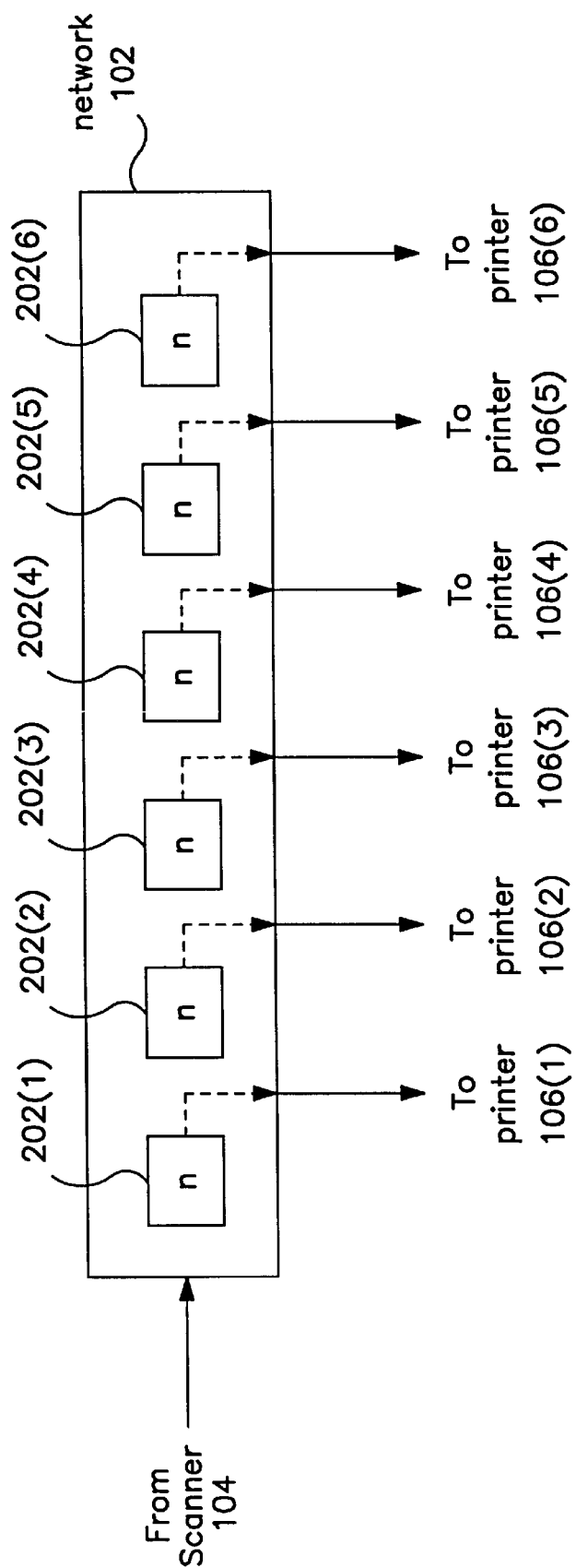
FIG. 2 is a conventional schematic diagram showing data for document "n" 202 being sent six times over a conventional network 102 by a scanner 104 in order to be received and printed by six individual printers 106 (1–6).
Figure 3:
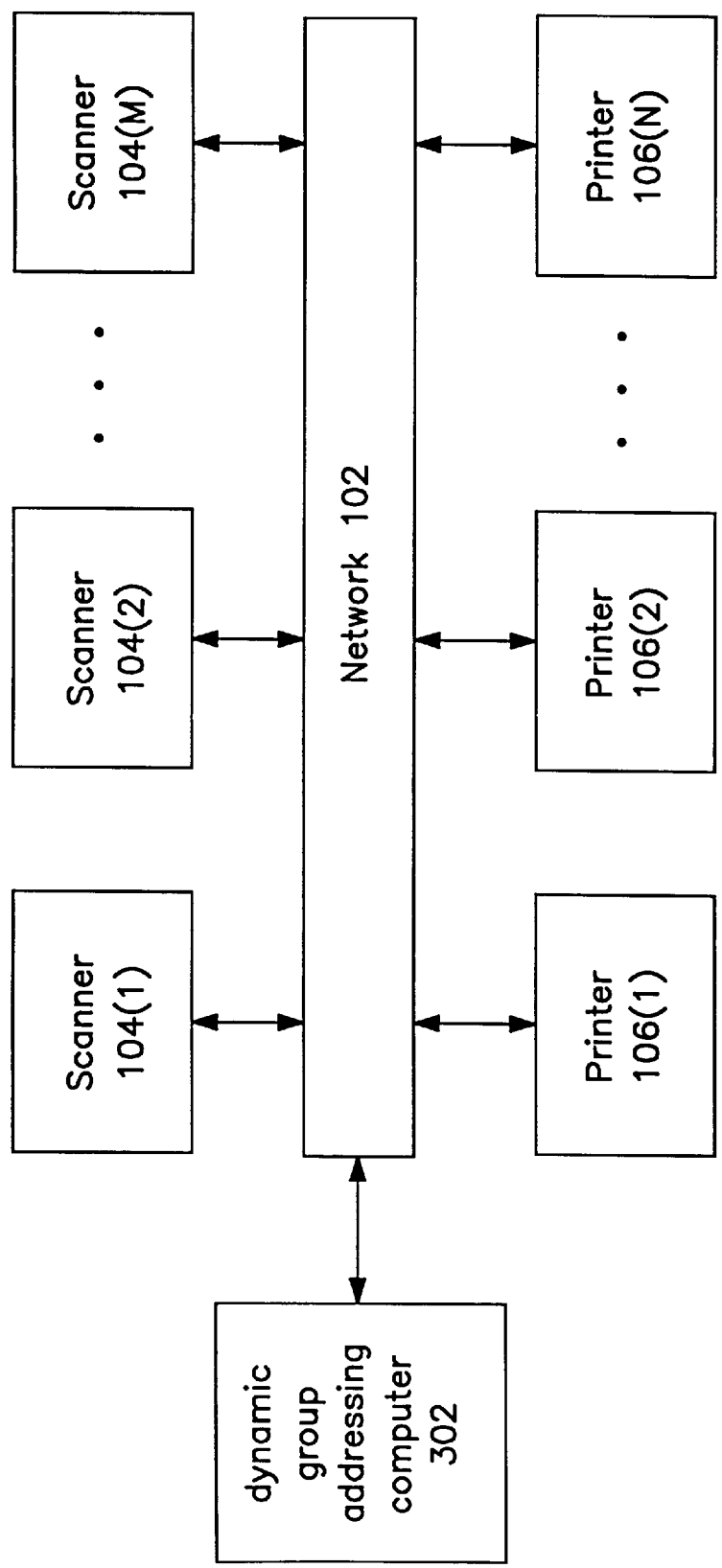
FIG. 3 is a schematic diagram of a networked system including a plurality of scanners 104(1–M), a plurality of printers 106(1–N), and a dynamic group addressing computer 302, according to a preferred embodiment of the present invention.

FIG. 3 is a schematic diagram of a networked system including a plurality (M) of scanners 104(1 to M), a plurality (N) of printers 106(1 to N), and a dynamic group assigning computer or server 302, according to a preferred embodiment of the present invention. The dynamic group assigning computer 402 controls the system and may be used to allow an operator to group the printers 106 into various groups for various jobs. However, the dynamic group addressing computer 402 need not be a separate computer as this function may, for example, be integrated into a scanner 104. The scanners 104 may be digital scanners, workstations, personal computers, or other sending or input devices. The printers 106 may be laser printers, digital copiers, monitors, or other receiving or output devices. The network 102 may be ethernet, token ring, fast ethernet, FDDI, or another network system.

The printers 106 are set up with both individual network addresses for solo operation and shared group network addresses for parallel operation. The scanners 104 have at least individual network addresses. Each printer 106 "listens" to the network 102 for packets of document data sent to either its individual address or to its group address. Each printer 106 also confirms receipt of the pages by sending a confirmation packet to the scanner 104 at the source address of the packets of document data.

According to the present invention, a network of N printers and M scanners can process M print jobs simultaneously to any portion of the N printers as determined by the group address assignments. For example, twenty (20) printers working with four (4) scanners may be assigned into four (4) equal groups of five (5) printers each. A more complex assignment may be utilized, such as one group of ten (10) printers being assigned to one scanner, two groups of four (4) printers being assigned to two scanners, and one group of two (2) printers being assigned to one scanner.

In a preferred embodiment of the present invention, printers 106 are set up with both the conventional individual network addresses for solo operation and a new shared group network address for parallel operation.

Figure 4A:
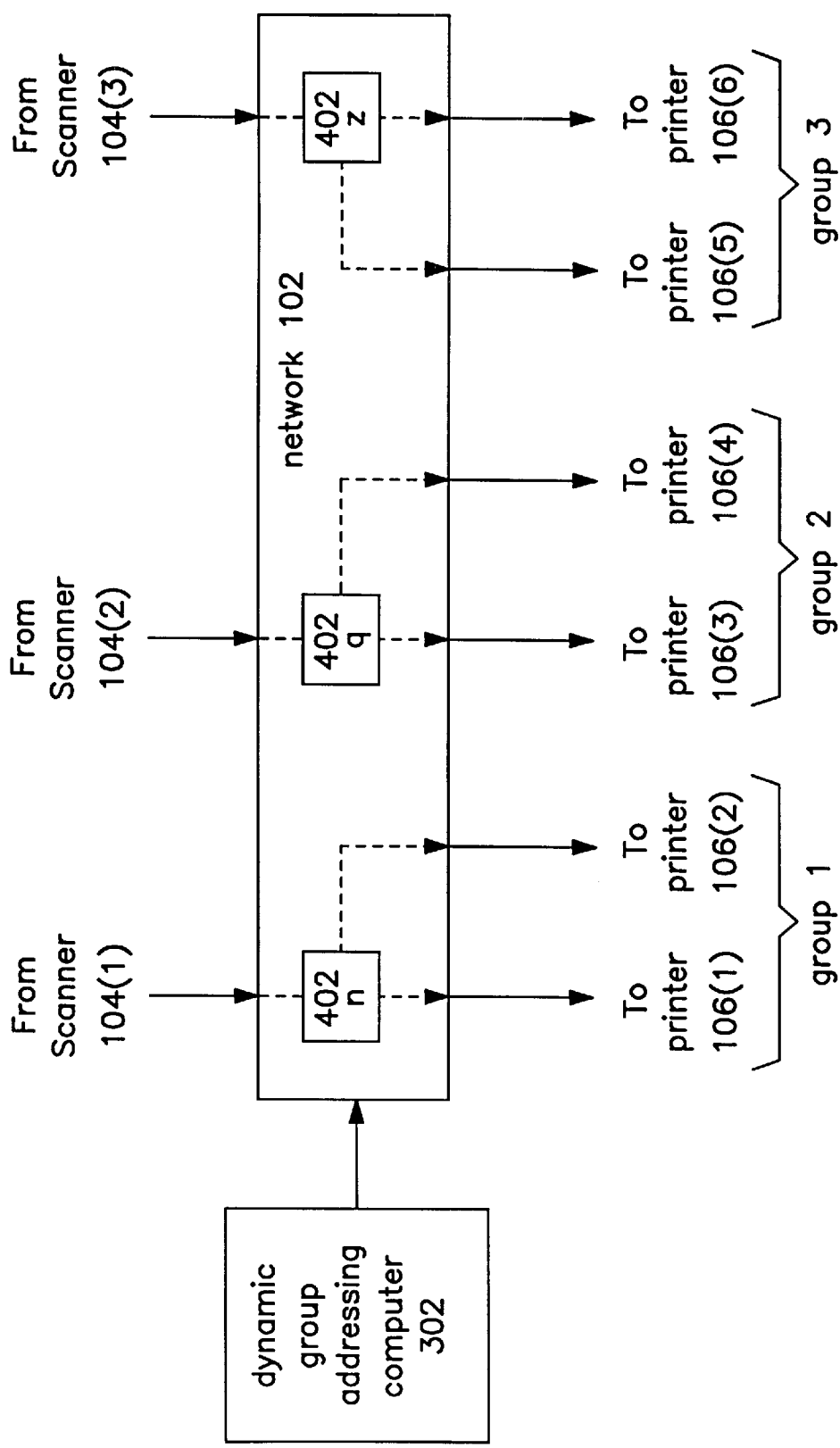
FIGS. 4(a), 4(b), and 4(c) illustrate an example of dynamic group addressing according to a preferred embodiment of the present invention.
Figure 4B:
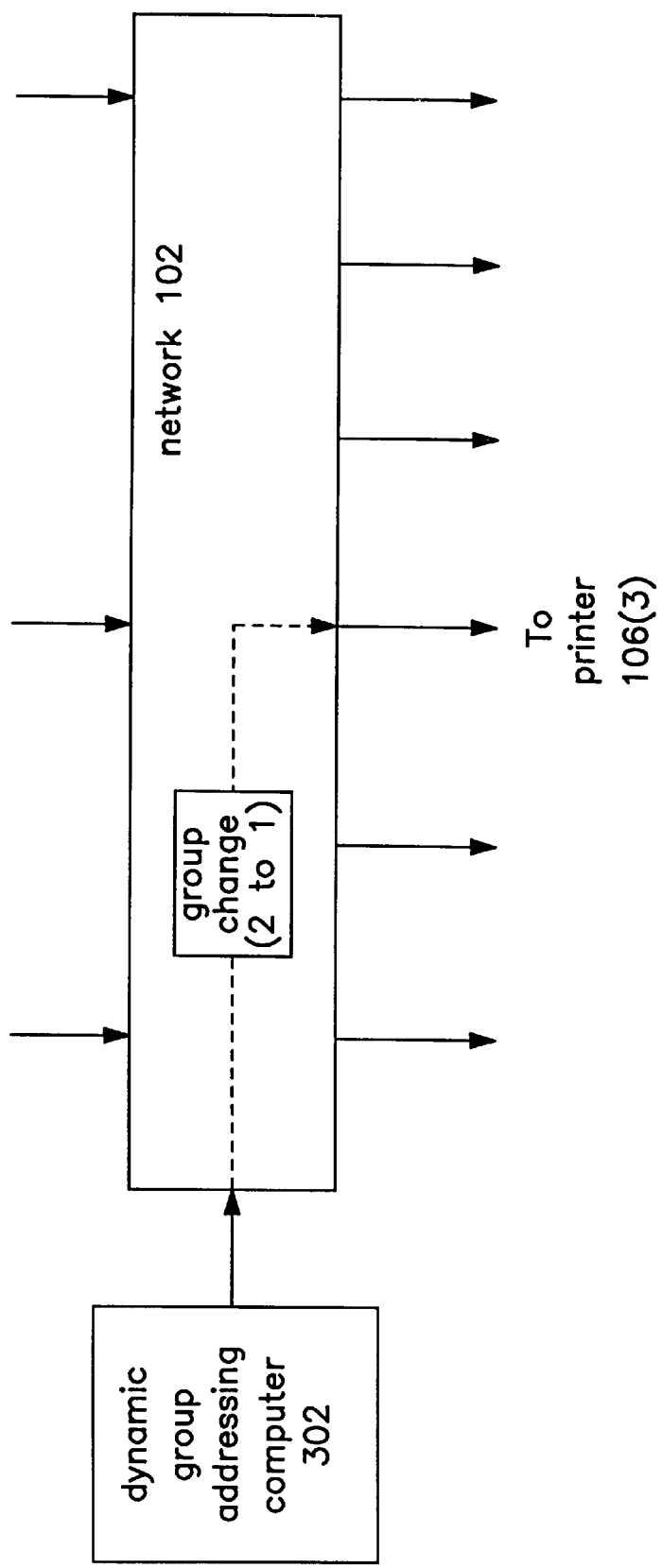
Figure 4C:
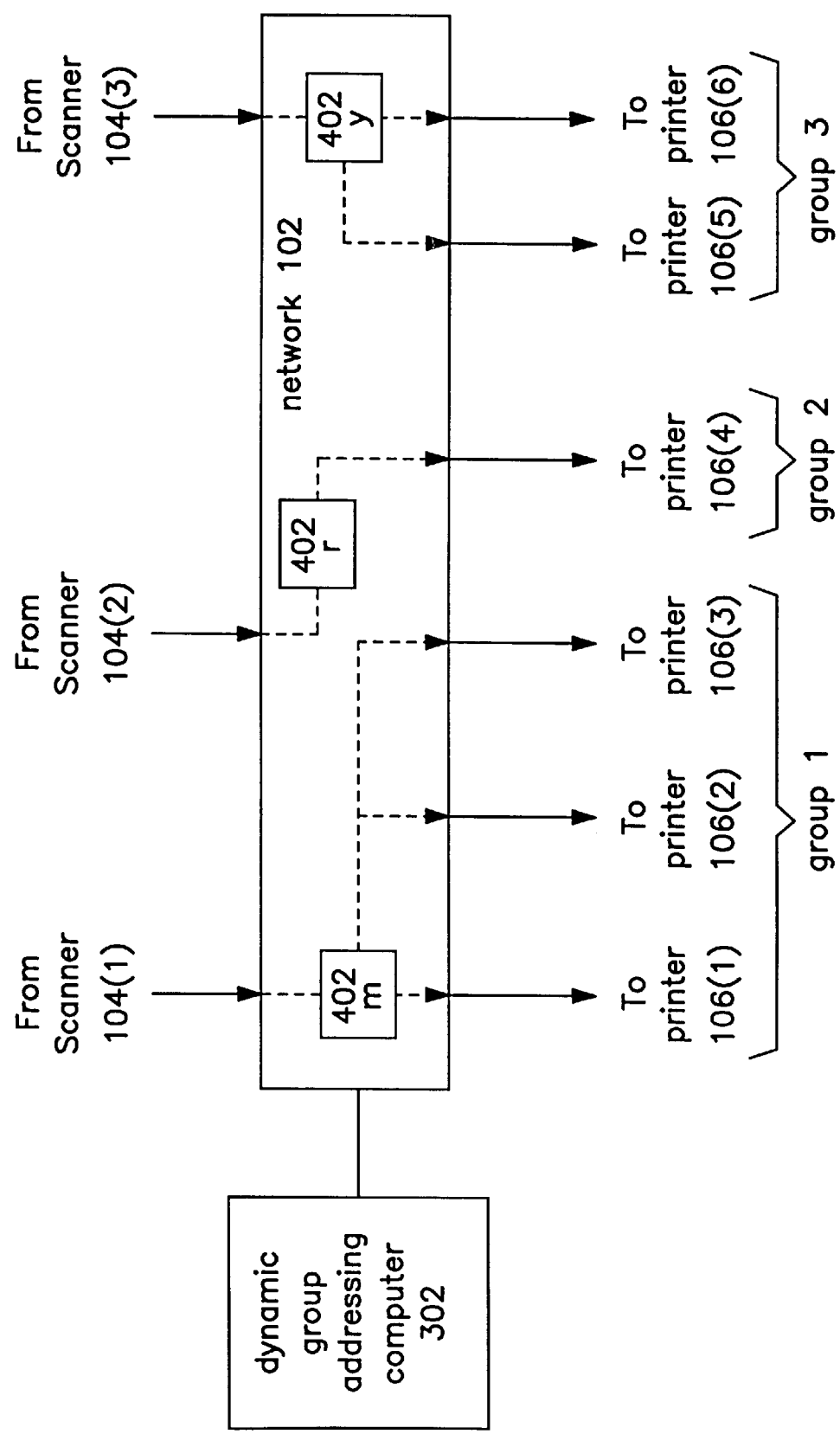

FIGS. 4(*a*), 4(*b*), and 4(*c*) illustrate an example of dynamic group addressing according to a preferred embodiment of the present invention. In this example, consider a network including 3 scanners 104 (1 to 3) and 6 printers 106 (1 to 6).

First, consider initially that printers 106(1) and 106(2) are members of group 1 in that they are configured to receive packets which are multicast to group address 1. Second, consider initially that printers 106(3) and 106(4) are members of group 2 in that they are configured to receive packets which are multicast to group address 2. Third, consider initially that printers 106(5) and 106(6) are members of group 3 in that they are configured to receive packets which are multicast to group address 3. Finally, consider that scanner 104(1) is set to multicast to group address 1, scanner 104(2) is set to multicast to group address 2, and scanner 104(3) is set to multicast to group address 3.

As shown in FIG. 4(*a*), for example, in parallel, scanner 104(*1*) may be multicasting packets of data of document "n" to group address 1, scanner 104(2) may be multicasting packets of data of document "q" to group address 2, and scanner 104(3) may be multicasting packets of data of document "z" to group address 3. Only one copy of each page needs to be multicast by each scanner to the network 102.

Printers 106(1) and 106(2) will each receive the multicast packets with group address 1 and so will in parallel each print a copy of document "n." Similarly, printers 106(3) and 106(4) will in parallel each receive and print a copy of document "q," and printers 106(5) and 106(6) will in parallel each receive and print a copy of document "z."

As shown in FIG. 4(*b*) dynamic group addressing computer 302 may subsequently change the group assignment of printer 106(3) by sending an assignment packet addressed to that individual printer 106(3), the assignment packet including an instruction to change group membership such that the printer 106(3) receives packets sent to group address 1, instead of those sent to group address 2. Hence, printer 106(3) becomes a member of group 1, instead of group 2. This is an example of dynamic assignment of group addresses. Thus, group 1 now includes printers 106(1) to 106(3), group 2 now includes only printer 106(4), and group 3 still includes printers 106(5) and 106(6).

The operation of the network subsequent to the dynamic assignment of group addresses is shown in FIG. 4(*c*). In this example, the scanners 104(1) to 104(3) have not changed the group addresses to which they multicast. So, scanner 104(1) multicasts packets of data corresponding to document "m" to group address 1, scanner 104(2) multicasts packets of data corresponding to document "r" to group address 2, and scanner 104(3) multicasts packets of data corresponding to document "y" to group address 3. Only one copy of each document needs to be multicast by each scanner to the network 102.

Printers 106(1), 106(2), and 106(3) will each receive the multicast packets with group address 1 and so in parallel will each print a copy of document "m." Similarly, printer 106(4) will receive multicast packets with group address 2 and so will print a copy of document "r." Lastly, printers 106(5) and 106(6) will each receive the multicast packets with group address 3 and so in parallel will each print a copy of document "y."

An advantage of such a system is that it permits large numbers of printers to receive and confirm receipt of each page without crowding the network bandwidth and slowing system performance. A further advantage of such a system is that the setup of new printers is simplified.

Moreover, the group address technique of the present invention enables dynamic reconfiguration of the printer groups. This is done in an especially efficient manner by simply reassigning the group addresses. An advantage of this dynamic reassignment capability is that it provides much more flexibility in the use of the multiple printers to simultaneously print a number jobs at various speeds.

Figure 5A:
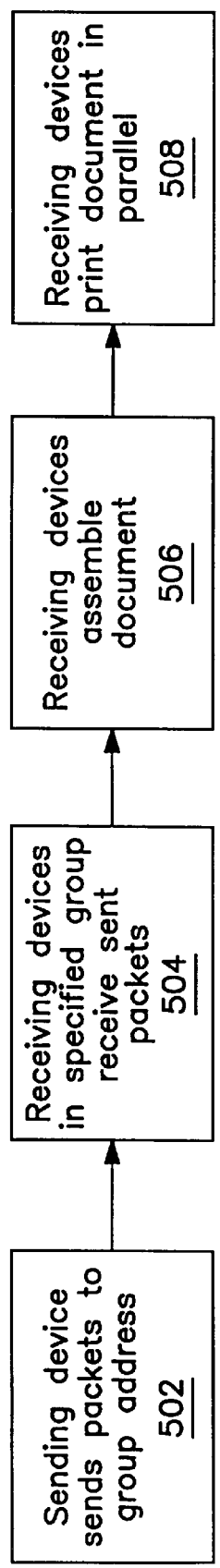
FIG. 5(a) is a flowchart showing the overall steps of an embodiment of the present invention.
Figure 5B:
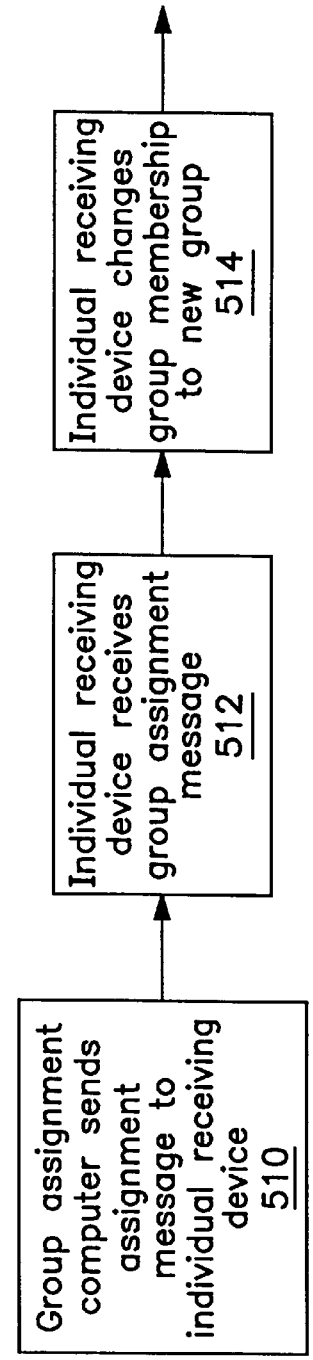
FIG. 5(b) is a flowchart showing the steps of reassigning a group address of a receiving device in accordance with an embodiment of the present invention.

Referring now to FIG. 5(*a*), there is shown a flowchart of the operation of a preferred embodiment of the invention. Scanner 104 first sends 502 data packets having as their destination address a group address. Receiving devices 106 receive 504 the packets having a destination address corresponding to their group address. Receiving devices 106 assemble 506 the data packets to reconstitute the document, and then print 508 the document in parallel.

Referring now to FIG. 5(*b*), there is shown a flowchart illustrating the steps of dynamic reassignment of group addresses as described above with reference to FIG. 4(*b*). First, group assignment computer 302 sends 510 an assignment packet addressed to an individual receiving device 106, the assignment packet including an instruction to change group membership. Next, the individual receiving device 106 receives 512 the assignment packet and changes 514 its group membership to the group specified in the instruction.

The above description is included to describe the operation of the preferred embodiments and is not meant to limit the scope of the invention. For example, the network 102 could be another type of network besides 10 Mbit Ethernet, such as token ring or 100 Mbit Ethernet. As another example, this technique is independent of page size and whether the scanners 104 or printers 106 (or digital copiers) are color, grayscale, or monochrome. The scope of the invention is to be limited only by the following claims.

What is claimed is:

1. A system for parallel printing of documents, the system comprising:

a digital document sending device for generating and sending a packet to a plurality of digital document receiving devices over a network, the packet including a destination address and digital document data;

at least two digital document receiving devices for receiving the packet and printing the documents, each receiving device having a same group address, the group address corresponding to the destination address of the packet; and a group address assigning computer for sending an individually addressed packet including a group assignment command and a group address to at least one receiving device via the network to control assignment and reassignment of the group address to the receiving device.

2. The system of claim 1, wherein each of the receiving devices has an individual address which identifies additional packets to be received by said receiving device.

3. The system of claim 1, further comprising plural sending devices, wherein each of the sending devices has an individual address which identifies other packets to be received by said sending device.

4. The system of claim 3, wherein the receiving devices, upon receipt of the digital document data for the documents, sends confirmation packets including confirmation data via the network to corresponding sending devices to verify printing of the documents.

5. The system of claim 1, wherein the assigning computer is the sending device.

6. The system of claim 1, wherein the sending device includes a scanner device.

7. The system of claim 1, wherein the sending device includes a digital copier device.

8. The system of claim 1, wherein the receiving devices include a laser printer.

9. A method for parallel printing of documents, the method comprising:

sending a first set of packets by a sending device once over a network, the first set of packets including first digital document data and a group address as a destination address;

receiving the first set of packets from the network in parallel by a group of receiving devices which have been assigned the group address, the group of receiving devices comprising a plurality of receiving devices;

reconstituting the first document from the first set of packets by each receiving device of the group of receiving devices;

printing the first document in parallel by the group of receiving devices;

sending an assignment packet over the network, the assignment packet including assignment data and an individual address as the destination address;

receiving the assignment packet from the network by an individual receiving device which is configured to receive packets sent to the individual address;

changing a group assignment of the individual receiving device according to the assignment data, such that membership in the group of receiving devices is changed;

sending a second set of packets by the sending device once over the network, the second set of packets including second digital document data and the group address as the destination address;

receiving the second set of packets from the network in parallel by the group of receiving devices;

reconstituting the second document from the first set of packets by each receiving device of the group of receiving devices; and printing the second document in parallel by the group of receiving devices.

10. The method of claim 9, further comprising the step of:

sending a confirmation packet from each receiving device in the group of receiving devices via the network to the sending device.

11. A method for parallel printing of documents comprising the steps of:

controlling at least one sending device to send a packet including a destination address and document data to a network;

controlling each of at least two digital document receiving devices to receive the packet and to print a document based on the document data of the packet, each of the receiving devices having a same group address, the group address corresponding to the destination address of the packet; and controlling assignment and reassignment of the group address to at least one of said at least two receiving devices by sending an individually addressed packet including a group assignment command and a group address to said one receiving device via the network.

12. A method according to claim 11, wherein the sending device is a scanner device or a copier device.

13. A method according to claim 11, wherein one of the plurality of receiving devices is a laser printer.

14. A computer-readable memory medium for storing a computer program for parallel printing of documents, wherein the program controls devices and comprises instructions for:

controlling a sending device to send a packet including a destination address and digital document data to at lest two digital document receiving devices over a network;

controlling each of said at least two receiving devices to receive the packet and to print a document based on the digital document data of the packet, each of the receiving devices having a same group address, the group address corresponding to the destination address of the packet; and controlling assignment and reassignment of the group address to at least one of said at least two receiving devices by sending an individually addressed packet including a group assignment command and a group address to said one receiving device via the network.

15. A computer-readable memory medium according to claim 14, wherein the sending device is a scanner device or a copier device.

16. A computer-readable memory medium according to claim 14, wherein one of the at least two receiving devices is a laser printer.

17. A computer program for parallel printing of documents, the program controlling devices and comprising computer instructions for:

controlling a sending device to send a packet including a destination address and digital document data to at least two digital document receiving devices over a network;

controlling each of at least two receiving devices to receive the packet and to print a document based on the digital document data of the packet, each of the receiving devices having a same group address, the group address corresponding to the destination address of the packet; and controlling assignment and reassignment of the group address to at least one of said at least two receiving devices by sending an individually addressed packet including a group assignment command and a group address to said one receiving device via the network.

18. A computer program according to claim 17, wherein the sending device is a scanner device or a copier device.

19. A computer program according to claim 17, wherein the receiving device is a laser printer.

20. A method for controlling group address assignments in a printing system for parallel printing of documents comprising the steps of: controlling at least one sending device to send a packet including a destination address and document data to a network, each sending device having a corresponding group address which is applied to be the destination address of the packet sent by said sending device; and sending an assignment packet including an assignment command and a group address to at least one receiving device over the network, wherein the group address identifies the packet to be received by said receiving device and all of plural receiving devices having the same assigned group address as the destination address receive the packet.

21. A method according to claim 20, wherein the sending device is a scanner device or a copier device.

22. A computer program for controlling group address assignments in a printing system for parallel printing of documents, the program controlling devices and comprising computer instructions for:

controlling at least one sending device to send a packet including a destination address and document data to a network, each sending device having a corresponding group address which is applied to be the destination address of the packet sent by said sending device; and sending an assignment packet including an assignment command and a group address to at least one receiving device over the network, wherein the group address identifies the packet to be received by said receiving device and all of plural receiving devices having the same assigned group address as the destination address receive the packet.

23. A computer program according to claim 22, wherein the sending device is a scanner device or a copier device.

\* \* \* \* \*